United States Patent
Engel

(10) Patent No.: US 10,197,752 B2
(45) Date of Patent: Feb. 5, 2019

(54) MONOLITHIC MULTI-OPTICAL-WAVEGUIDE PENETRATOR OR CONNECTOR

(71) Applicant: WEATHERFORD/LAMB, INC., Houston, TX (US)

(72) Inventor: Thomas W. F. Engel, East Hampton, CT (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 590 days.

(21) Appl. No.: 13/774,749

(22) Filed: Feb. 22, 2013

(65) Prior Publication Data

US 2014/0241693 A1  Aug. 28, 2014

(51) Int. Cl.
| | |
|---|---|
| *G02B 6/38* | (2006.01) |
| *G02B 6/28* | (2006.01) |
| *G02B 6/42* | (2006.01) |

(52) U.S. Cl.
CPC .......... *G02B 6/4248* (2013.01); *G02B 6/2856* (2013.01); *G02B 6/3816* (2013.01); *G02B 6/3851* (2013.01); *G02B 6/3855* (2013.01); *G02B 6/3885* (2013.01); *Y10T 156/1052* (2015.01); *Y10T 156/1062* (2015.01)

(58) Field of Classification Search
None
See application file for complete search history.

(56) References Cited

U.S. PATENT DOCUMENTS

| | | | | |
|---|---|---|---|---|
| 6,229,827 | B1 * | 5/2001 | Fernald et al. | ................. 372/20 |
| 6,496,625 | B1 * | 12/2002 | Falkowich | ........... G02B 6/2558 385/100 |
| 6,826,343 | B2 * | 11/2004 | Davis | ................. G02B 6/02042 385/126 |
| 6,982,996 | B1 * | 1/2006 | Putnam | .................... G02B 6/02 372/6 |
| 7,747,126 | B2 * | 6/2010 | Dunphy et al. | ............... 385/138 |
| 7,751,677 | B2 | 7/2010 | Dunphy | |
| 2007/0003206 | A1 | 4/2007 | Dunphy et al. | |

* cited by examiner

*Primary Examiner* — Thomas A Hollweg
*Assistant Examiner* — Erin Chiem
(74) *Attorney, Agent, or Firm* — Patterson & Sheridan, LLP

(57) ABSTRACT

Methods and apparatus are provided for a monolithic multi-optical-waveguide penetrator or connector. One example apparatus generally includes a plurality of large diameter optical waveguides, each having a core and a cladding, and a body having a plurality of bores with the optical waveguides disposed therein, wherein at least a portion of the cladding of each of the optical waveguides is fused with the body, such that the apparatus is a monolithic structure. Such an apparatus provides for a cost- and space-efficient technique for feedthrough of multiple optical waveguides. Also, the body may have a large outer diameter which can be shaped into features of interest, such as connection alignment or feedthrough sealing features.

13 Claims, 6 Drawing Sheets

MONOLITHIC MULTI-OPTICAL-WAVEGUIDE PENETRATOR OR CONNECTOR

BACKGROUND OF THE INVENTION

Field of the Invention

Embodiments of the present invention relate to feedthroughs and connectors for optical waveguides and, more particularly, to monolithic multi-optical-waveguide feedthroughs and connectors.

Description of the Related Art

In many industries and applications, there is a need to have electrical wires or optical waveguides penetrate a wall, bulkhead, or other feedthrough member wherein a relatively high fluid differential pressure exists across the feedthrough member. In addition, one or both sides of the feedthrough member may be subjected to relatively high temperatures and other harsh environmental conditions, such as corrosive or volatile gas, liquids, and other materials.

Recently, with the introduction of optical sensors, particularly sensors for use in oil and gas exploration and production and for deployment in harsh industrial environments, a need has emerged for a bulkhead feedthrough that can seal an optical fiber at high pressures of 20,000 psi and above, and high temperatures of at least 150° C. to 300° C., with a service life of at least 5 to 20 years.

There are several problems associated with constructing such an optical fiber feedthrough. One of these problems is the susceptibility of the glass fiber to damage and breakage. This is due to the flexibility of the small diameter fiber, the brittle nature of the glass material, and the typical presence of a significant stress concentration at the point where the fiber enters and exits the feedthrough. Attempts to use a sealing glass, such as that used with electrical feedthroughs, have had problems of this nature due to the high stress concentration at the fiber-to-sealing glass interface.

Another problem with sealing an optical fiber, as opposed to sealing a conductive metal "pin" in an electrical feedthrough, is that the fused silica material of which the optical fiber is made, has an extremely low thermal expansion rate. Unlike most engineering materials—including metals, sealing glasses, as well as the metal pins typically used in electrical feedthroughs—the coefficient of thermal expansion of the optical fiber is essentially zero. This greatly increases the thermal stress problem at the glass-to-sealing material interface.

As discussed above, the harsh environments where the sensors are located generally must be isolated by sealed physical barriers from other proximate environments through which the optical fiber communication link of the sensor must pass. It is important to seal the bulkhead around the optical fiber to prevent environments adjacent to the sensor from contaminating the optical fiber communication link. If the optical communication fiber is compromised by contamination from an adjacent harsh environment, the optical fiber and all sensors to which it is connected are likely to become ineffective.

An exemplary sensing assembly for use in harsh environments is disclosed in U.S. Pub. No. 2007/0003206 to Dunphy et al., entitled "Optical Waveguide Feedthrough Assembly," which is assigned to the Assignee of the present application and is incorporated herein by reference in its entirety. Dunphy discloses the optical waveguide feedthrough assembly of FIG. 1. The assembly 100 includes a front housing 10 coupled to a back housing 12. An optical waveguide element 14 passes through a passageway 16 common to both housings 10, 12. The passageway 16 is defined by bores extending across the housings 10, 12. The optical waveguide element 14 includes a glass plug 18 defining a large-diameter, cane-based, optical waveguide preferably having an outer diameter of about 3 millimeters (mm) or greater. The glass plug 18 can have appropriate core and cladding dimensions and ratios to provide the desired outer large-diameter.

First and second fiber pigtails 19, 20 extend from each end of the glass plug 18. Each of the pigtails 19, 20 includes an optical waveguide such as an optical fiber 26 encased or embedded in a carrier 28 or larger diameter glass structure allowing the fiber 26 to be optically coupled to the glass plug 18. Sealing of the optical waveguide element 14 with respect to the front housing 10 occurs at and/or around the glass plug 18 to enable isolation of fluid pressure in communication with a first end 22 of the passageway 16 from fluid pressure in communication with a second end 24 of the passageway 16. This sealing of the glass plug 18 with respect to the front housing 10 provides the feedthrough capabilities of the feedthrough assembly 100. The glass plug 18 has a cone-shaped tapered surface 50 for seating against a complementary tapered seat 51 of the front housing 10. Engagement between the tapered surface 50 and the complementary tapered seat 51 that is located along the passageway 16 forms a seal that seals off fluid communication through the passageway 16. The glass plug 18 can be machined to provide the cone-shaped tapered surface 50. Additionally, the glass plug 18 is preferably biased against the tapered seat 51 using a mechanical preload.

A recess 30 formed in one end of the front housing 10 aligns with a corresponding recess 31 in one end of the back housing 12 where the housings 10, 12 are coupled together. Preferably, the front housing 10 is welded to the back housing 12 along mated features thereof. The housings 10, 12 preferably enclose the glass plug 18, a biasing member such as a first stack of Belleville washers 34, and a plunger 32, which are all disposed within the recesses 30, 31.

The first stack of Belleville washers 34 supply the mechanical preload by pressing the plunger 32 onto an opposite end of the glass plug 18 from the tapered surface 50. Since the plunger 32 is moveable with the glass plug 18, this pressing of the plunger 32 develops a force to bias the glass plug 18 onto the tapered seat 51 of the front housing 10 located along the passageway 16 that passes through the front housing 10. Transfer of force from the plunger 32 to the glass plug 18 can occur directly via an interface 54 between the two, which can include mating conical surfaces. The first stack of Belleville washers 34 compresses between a base shoulder 44 of the recess 31 in the back housing 12 and an outward shoulder 46 of the plunger 32 upon make-up of the front housing 10 to the back housing 12. Once the back housing 12 is welded or otherwise attached to the front housing 10 in order to keep the front and back housings 10, 12 connected, the first stack of Belleville washers 34 maintains the compression that supplies force acting against the plunger 32.

The feedthrough assembly 100 further includes a gasket member 52 disposed between the tapered seat 51 and the tapered surface 50 of the glass plug 18. The gasket member 52 comprises an annular gasket. The gasket member 52 may be a gold foil that is shaped to complement the tapered surface 50 and the tapered seat 51. The gasket member 52 deforms sufficiently to accommodate imperfections on the tapered surface 50 and/or the tapered seat 51, thereby completing the seal and reducing stress between contacting surfaces due to any imperfections on the surfaces.

The housings 10, 12 additionally enclose a cup-shaped backstop sleeve 36, a second stack of Belleville washers 38, a perforated washer 40, and a centering element 42 that are all disposed within the recesses 30, 31. An outward shoulder 56 of the backstop sleeve 36 is trapped by the end of the front housing 10 and an inward shoulder 57 along the recess 31 in the back housing 12. Contact upon sandwiching of the shoulder 56 of the backstop sleeve 36 provides the point at which the housings 10, 12 are fully mated and can be secured together. Clearance is provided such that the end of the back housing 12 does not bottom out prior to the housings 10, 12 being fully mated.

The centering element 42 includes an elastomeric sealing component disposed between the glass plug 18 and the front housing 10 that can act as a back-up seal in addition to facilitating alignment of the glass plug 18 with respect to the seat 51. The pressure in the recesses 30, 31 entering from the second end 24 of the passageway 16 is higher than the pressure entering from the first end 22 of the passageway 16. This pressure differential advantageously causes the centering element 42 to deform and press against the wall of the recess 30 and the wall of the glass plug 18, thereby creating a pressure-energized seal. One or more holes or annular channels 43 can be formed on the outer surface of the high pressure side of the centering element 42. These holes or channels 43 facilitate the deformation of the centering element 42 and the formation of the seal between the centering element 42 and the walls of the recess 30 and the glass plug 18. Additionally, the perforated washer 40 enables pressurized fluid to fill the centering element 42 for providing the energized seal.

Preferably, force transferred through the perforated washer 40 biases the centering element 42 into the recess 30. The second stack of Belleville washers 38 pressed by the backstop sleeve 36 supplies the preloading force to the perforated washer 40. The second stack of Belleville washers 38 allow a maximum pressure force to act on the centering element 42 such that pressure of the centering element 42 against the wall of the glass plug 18 does not override force being put on the glass plug 18 to press the tapered surface 50 against the seat 51.

The assembly 100 is suited for feedthrough of a single optical waveguide. If feedthrough of multiple waveguides is desired, a separate assembly may be used for each individual waveguide. This means additional costs and additional space requirements on a production tree, for example.

Accordingly, there is a need for an optical waveguide feedthrough assembly capable of operating in relatively high temperature and high pressure environments in which multiple optical waveguides are fed through.

SUMMARY OF THE INVENTION

Embodiments of the present invention generally relate to monolithic feedthroughs and connectors supporting multiple optical waveguides. Certain advantages (e.g., reduced strain) provided by these monolithic structures may also be applicable to a single (large diameter) optical waveguide fused into a larger capillary.

One embodiment of the present invention provides an apparatus for transmitting light along multiple pathways. The apparatus generally includes a plurality of large diameter optical waveguides, each having a core and a cladding, wherein the apparatus is a monolithic structure. For some embodiments, the apparatus further includes a body having a plurality of bores with the optical waveguides disposed therein, wherein at least part of the cladding of each of the optical waveguides is fused with the body to form the monolithic structure.

Another embodiment of the present invention is a method for forming an apparatus for transmitting light along multiple pathways. The method generally includes positioning a plurality of large diameter optical waveguides, each having a core and a cladding, in a plurality of bores of a body and fusing at least a portion of the cladding of each of the optical waveguides with the body, such that the apparatus resulting therefrom is a monolithic structure.

Yet another embodiment of the present invention provides an optical waveguide feedthrough assembly. The assembly generally includes a housing, an apparatus for transmitting light along multiple pathways, wherein the apparatus is at least partially disposed in the housing, and one or more annular sealing elements disposed between an inner surface of the housing and an outer surface of the apparatus. The apparatus is a monolithic structure and generally includes a plurality of large diameter optical waveguides, each having a core and a cladding. For some embodiments, the apparatus further includes a body having a plurality of bores with the optical waveguides disposed therein, wherein at least a portion of the cladding of each of the optical waveguides is fused with the body to form the monolithic structure.

Yet another embodiment of the present invention is a method for forming an apparatus for transmitting light along multiple pathways. The method generally includes positioning a plurality of large diameter optical waveguides, each having a core and a cladding, adjacent one another and fusing at least a portion of the cladding of each of the optical waveguides with the cladding of another one of the optical waveguides, such that the apparatus resulting therefrom is a monolithic structure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
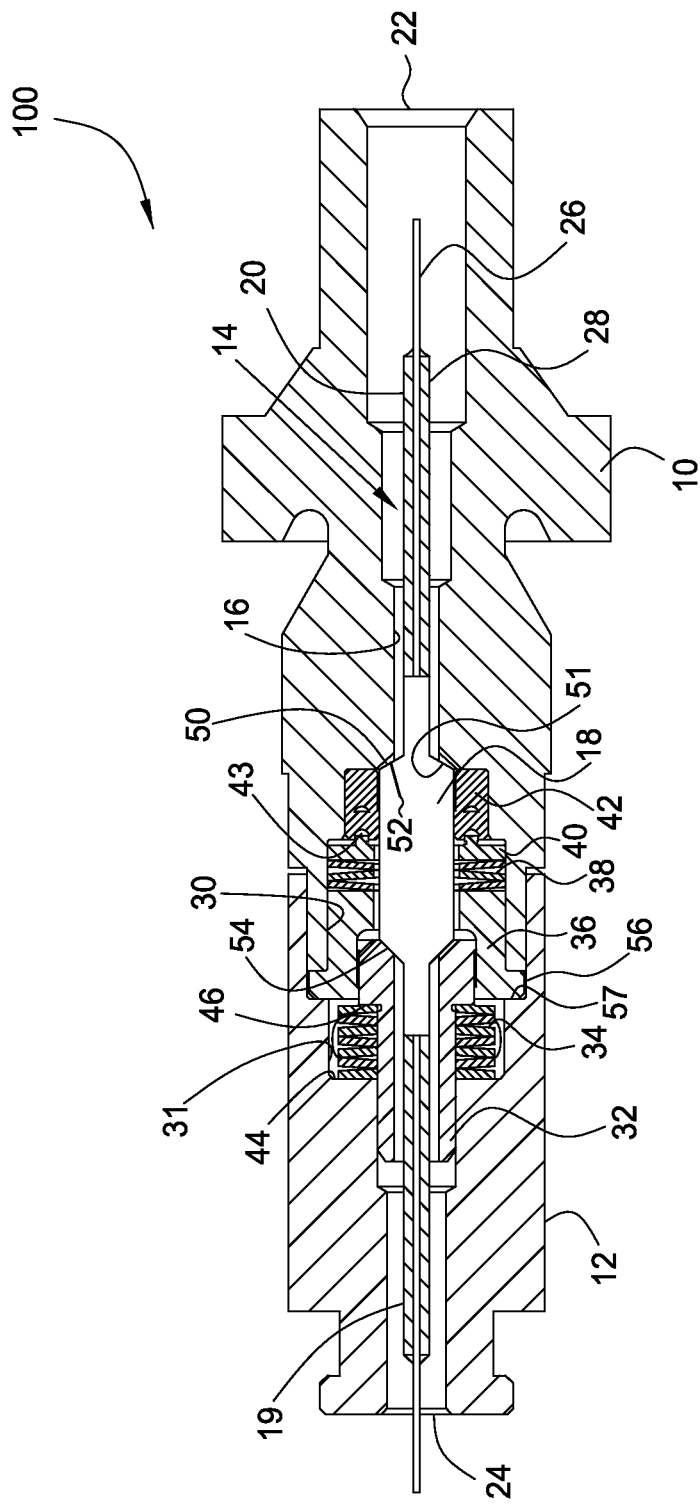
FIG. 1 illustrates a cross-sectional view of a prior art optical waveguide feedthrough assembly.

As described above, current approaches to optical waveguide feedthroughs use glass to metal seals constructed from drawn cane. These approaches are limited to around 5 mm outer diameters without specialized equipment and thus are not capable of spreading out stress loads. The approaches are non-monolithic or limited to single waveguides, thus involving multiple duplicates to accommodate multiple waveguides. Similarly, the components are limited to single waveguide connections, or connections built up from single waveguide approaches.

Accordingly, what is needed are techniques and apparatus to reduce glass stress when sealing multiple fiber optic components against high pressure and to achieve high temperature multi-waveguide fiber optic cable fluid block and connectorization with low loss.

Embodiments of the present invention provide techniques and apparatus for a robust, reliable, high pressure optical waveguide feedthrough (penetrator) or connector that utilizes a monolithic glass structure. In one embodiment, the apparatus includes a plurality of large diameter optical waveguides, each having a core and a cladding, and a body having a plurality of bores with the optical waveguides disposed therein, wherein at least part of the cladding of each of the optical waveguides is fused with the body, such that the apparatus is a monolithic structure. In another embodiment, the apparatus includes a plurality of large diameter optical waveguides, each having a core and a cladding, wherein at least part of the cladding of each of the optical waveguides is fused with the cladding of another one of the optical waveguides, such that the apparatus is a monolithic structure.

Although the reduced stress and other benefits provided by such monolithic structures are also applicable to a single (large diameter) optical waveguide fused into a larger capillary, only monolithic structures supporting multiple optical waveguides are described in detail below. From this description, the ideas disclosed herein can be adapted to a capillary tube having only a single bore for supporting one optical waveguide.

As used herein, "optical fiber," "glass plug," and the more general term "optical waveguide" refer to any of a number of different devices that are currently known or may later become known for transmitting optical signals along a desired pathway. For example, each of these terms can refer to single mode, multi-mode, birefringent, polarization-maintaining, polarizing, multi-core or multi-cladding optical waveguides, or flat or planar waveguides. The optical waveguides may be made of any glass (e.g., silica, phosphate glass, or other glasses), of glass and plastic, or solely of plastic. For high temperature applications, optical waveguides composed of a glass material are desirable. Furthermore, any of the optical waveguides can be partially or completely coated with a gettering agent and/or a blocking agent (such as gold) to provide a hydrogen barrier that protects the waveguide.

An Example Monolithic Multi-Optical-Waveguide Penetrator

Figure 2:
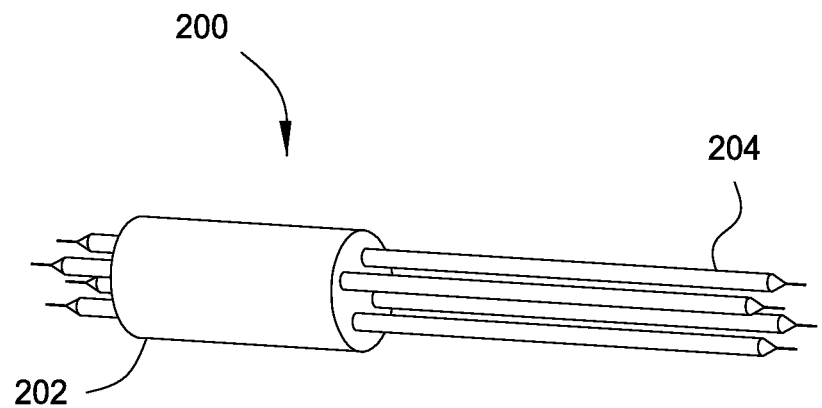
FIG. 2 is a diagram conceptually illustrating a monolithic multi-waveguide structure, according to an embodiment of the present invention.

FIG. 2 conceptually illustrates a monolithic structure 200 with multiple optical waveguides fused with multiple bores of a capillary tube 202. Embodiments of the present invention, such as the monolithic structure 200, may be used in place of the optical waveguide element 14 of FIG. 1. As shown, the monolithic structure 200 includes a capillary tube 202 and a plurality of large-diameter optical waveguides 204, each waveguide having a core and a cladding. Before fusing, the capillary tube 202 had a plurality of bores running through the length of the capillary tube 202. Although four bores are shown in FIG. 2 as an example, the tube 202 may include more or less than four bores, which may depend on the number of optical waveguides desired for a particular application. The plurality of optical waveguides 204 are inserted into the bores. As used herein, a large-diameter optical waveguide (also known as a cane waveguide) generally refers to an optical waveguide having an outer diameter (of the cladding) which is greater than or equal to 1 mm (and preferably at least 3 mm). The capillary tube 202 has a larger outer diameter than the outer diameter of the large-diameter optical waveguides 204.

After insertion of the waveguide 204, the capillary tube 202 is subjected to heat in one or more selected regions to fuse the capillary tube 202 and the optical waveguides 204 (at least within the collapsed region(s)). Typically performed with vacuum assist, this fusing collapses the bores of the capillary tube 202 around the cladding of the optical waveguides 204 to form a single monolithic structure. The monolithic structure 200 is able to conduct light energy through multiple paths and effectively increases the outer diameter of the plurality of optical waveguides 204.

In some embodiments, the capillary tube 202 and/or the core and cladding of each optical waveguide 204 are composed of silica glass, such as quartz. In some embodiments, the optical waveguides 204 may be 1 mm quartz cane waveguides for 1550 nm light. For some embodiments, the cladding of each optical waveguide 204 and capillary tube 202 have about the same temperature coefficient.

The capillary tube 202 may be a cylinder or have any of various other suitable shapes. The capillary tube 202 may be made of quartz formed by drawing or drilling (e.g., multi-bore tubing offered by Friedrich & Dimmock, Inc. of Milleville, N.J.). The capillary tube 202 may be shaped by grinding, machining, or other means to form any feature of interest.

Figure 3:
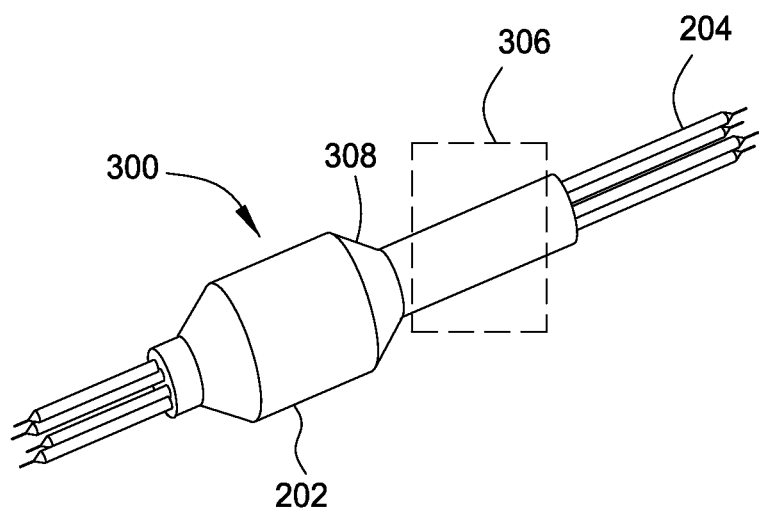
FIG. 3 is a diagram conceptually illustrating a monolithic multi-waveguide structure with a collapsed region and a larger outer diameter region, according to an embodiment of the present invention.

According to one embodiment, the capillary tube 202 may be shaped to form geometries important to sealing and stress reduction. For example, FIG. 3 illustrates another monolithic structure 300, similar to the monolithic structure 200 of FIG. 2, where the capillary tube 202 includes a collapsed region 306 (wherein fusing of the bores and optical waveguides 204 has occurred) and a shaped sealing region 308. In the embodiment shown in FIG. 3, the sealing region 308 has a convex frustoconical shape. The tapered ends of the convex frustoconical shaped sealing region 308 form sealing surfaces that are large compared to the outer diameter of the optical waveguides 204 and the collapsed region 306. In this manner, when the monolithic structure 300 is disposed in a wellhead feedthrough assembly, for example, downhole pressure may be distributed on the monolithic structure 300 in a desired manner, with a surface reacting force acting on the sealing surface furthest away from the collapsed region.

Figure 4:
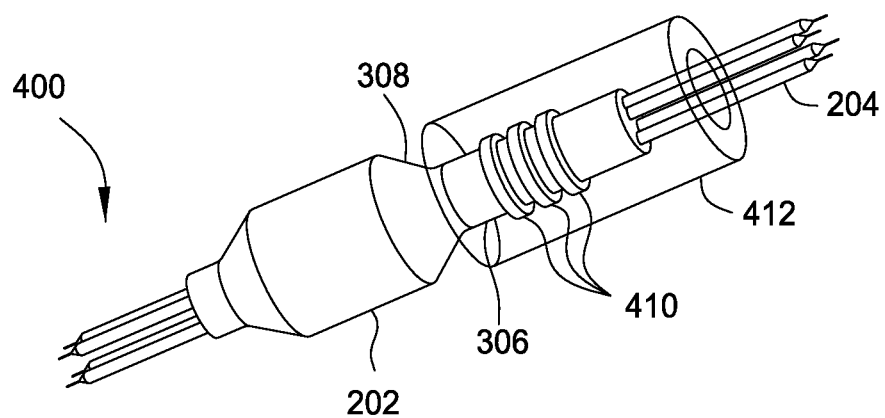
FIG. 4 is a diagram conceptually illustrating a monolithic multi-waveguide structure disposed in a housing with annulus seals disposed therebetween, according to an embodiment of the present invention.

In some embodiments, as shown in FIG. 4, the monolithic structure 200 may further include one or more annulus seals 410 (e.g., Accuseal, offered by Weatherford International with headquarters in Houston, Tex.) around the capillary tube 202 in collapsed region 306. The annulus seals 410 may be any of various suitable sealing elements, such as v-ring seals, chevron seals, o-ring seals, gasket seals, etc. The annulus seals 410 see internal pressure within a metal housing 412 corresponding to the outer diameter of the annulus seals 410. The glass, however, sees internal pressure within the metal housing corresponding to the smaller outer diameter of the capillary tube 202 in the collapsed region 306. According to some embodiments the annulus seals 410 seal an annulus around the smaller diameter collapsed region 306, while sealing region 308 has a larger outer diameter and thus reacts to the axial force on the optical waveguide 204 over a much larger area (surface reacting force) which provides reduced stress on the glass.

An Example Monolithic Multi-Optical-Waveguide Connector

Figure 5:
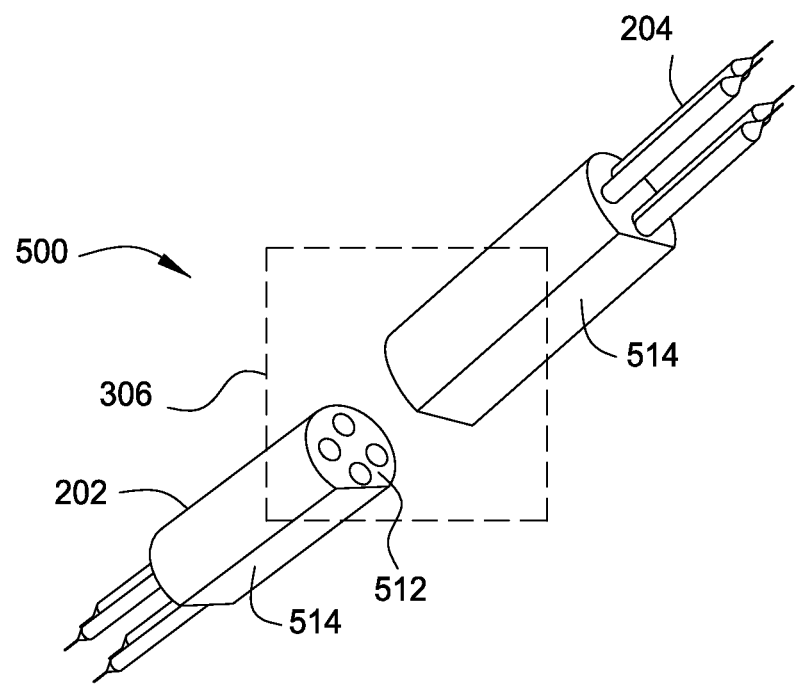
FIG. 5 is a diagram conceptually illustrating two monolithic multi-waveguide connectors with locating features, according to an embodiment of the present invention.

In some embodiments, the capillary tube 202 may be shaped to form geometries important to alignment of two monolithic multi-optical-waveguide connectors. As shown in FIG. 5, the capillary tube 202 may be shaped to include at least one locating feature 514. In the embodiment shown in FIG. 5, the locating feature 514 is a flat (i.e., a flat surface) along a length of the capillary tube 202. The flat is formed in an outer diameter of the capillary tube 202 and is parallel to an axis of the capillary tube 202. The capillary tube 202 may be divided (e.g., by cutting or dicing) in the collapsed region 306 to form a connector pair. The locating feature 514 allows the optical waveguides 204 to be realigned within the desired submicron alignment. In one embodiment, the parted capillary tube 202 may be realigned by butting the diced ends 512 against one another and using the flat (locating feature 514) to precisely align the outer diameter, thereby also aligning the optical waveguides 204. This is particularly useful for undersea wet connects. In some embodiments, the ends 512 of the cut portion may have a polished face. In some embodiments, rather than having flat faces, the diced ends 512 may be aligned and connected using male/female connectors, where each end 512 is shaped to mate with the other end 512.

Figure 6:
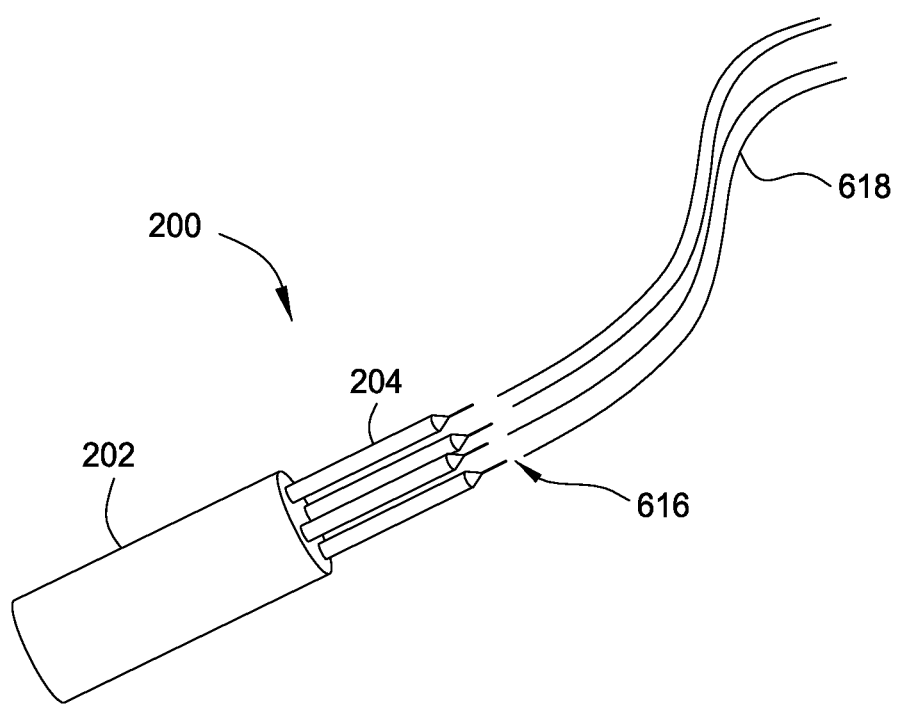
FIG. 6 is a diagram conceptually illustrating splicing of optical fibers to a monolithic multi-waveguide structure, according to an embodiment of the present invention.

As shown in FIG. 6, in some embodiments, individual optical waveguides 204 may be spliced using a cone or carrier splice at 616, for example, with optical fibers 618. In carrier splicing, for example, all but one of the carriers (which may be the optical waveguides 204) are pulled back, the remaining carrier is spliced, and this process is repeated for each carrier. In another embodiment, the carriers may be spliced using large diameter splicing (LDS) to the ends of the cane waveguides.

Figure 7:
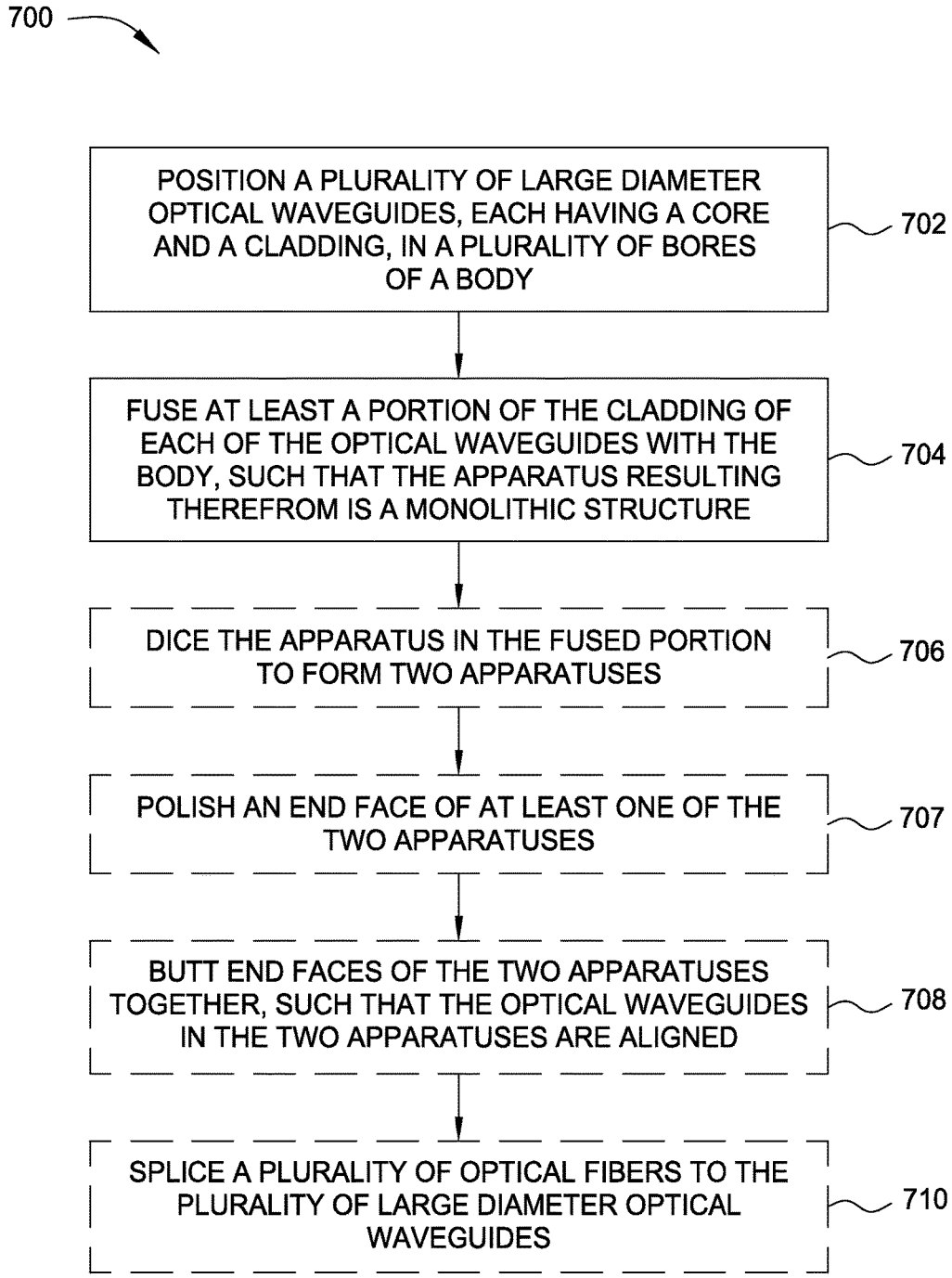
FIGS. 7 and 8 are flow diagrams illustrating example operations for forming a monolithic structure for transmitting light along multiple pathways.

Example Methods for Making a Monolithic Multi-Optical-Waveguide Penetrator or Connector FIG. 7 is a flow diagram illustrating example operations 700 for forming an apparatus for transmitting light along multiple pathways. The operations 700 begin, at 702, by positioning a plurality of large diameter optical waveguides (e.g., waveguides 204), each having a core and a cladding, in a plurality of bores of a body (e.g., the cylindrical capillary tube 202 of FIG. 2). According to some embodiments, the bores may be drilled in the body prior to positioning the optical waveguides in the bores. For other embodiments, the body having the plurality of bores may be drawn from a preform having a plurality of bores.

At 704, at least a portion of the cladding of each of the optical waveguides is fused with the body, such that the apparatus resulting therefrom is a monolithic structure (e.g., structure 200). For some embodiments, at least one orientation feature may be formed in the body before the fusing at 704 or in the apparatus after the fusing.

At 706, the apparatus may be diced in the fused portion to form two apparatuses. Each of the two apparatuses may be a monolithic structure (e.g., if the dicing occurs in the collapsed region 306). For some embodiments, an end face of at least one of the two apparatuses may be polished at 707. For some embodiments, at least one orientation feature may be formed in the two apparatuses (e.g., in the end faces 512 of the two apparatuses).

At 708, the end faces of the two apparatuses may be butted together, such that the optical waveguides in the two apparatuses are aligned. The optical waveguides may be aligned using at least one orientation feature (e.g., locating feature 514) in at least one of the two apparatuses. In some embodiments, the orientation feature may be at least one flat surface formed in an outer diameter of the body and parallel to an axis of the body.

At 710, a plurality of optical fibers (e.g., fibers 618) may be spliced (e.g., at 616) to the plurality of large diameter optical waveguides. The splicing may involve cone splicing or carrier splicing.

Figure 8:
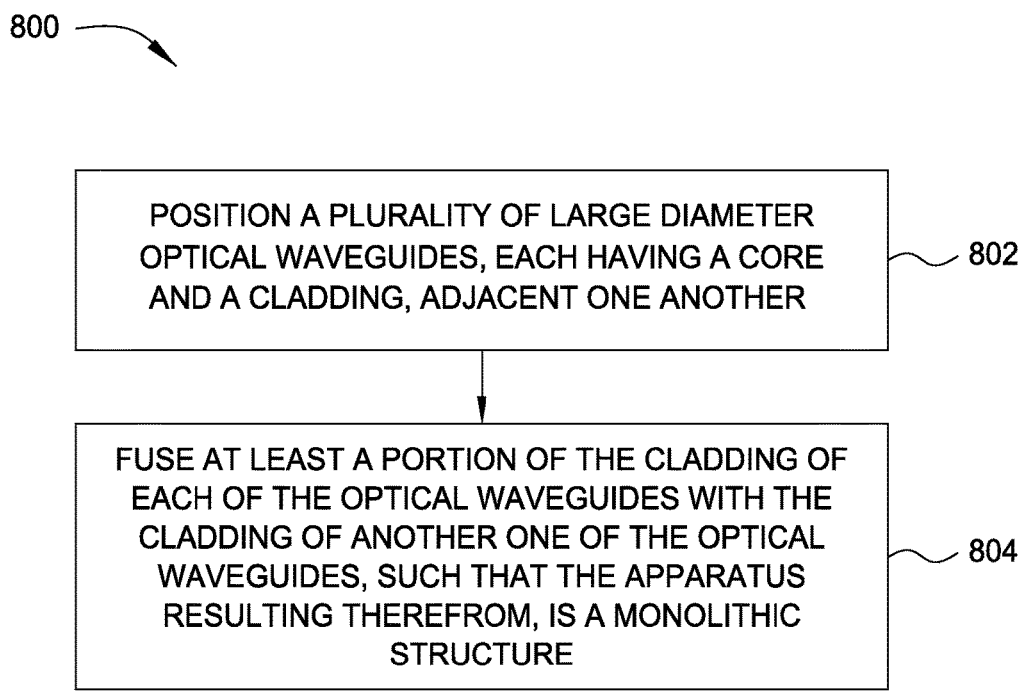

For some embodiments, a monolithic structure as described above may be formed without using a body (e.g., a capillary tube). For example, FIG. 8 is a flow diagram illustrating example operations 800 for forming an apparatus for transmitting light along multiple pathways by fusing the claddings of multiple large diameter optical waveguides together. The operations 800 may begin, at 802, by positioning a plurality of large diameter optical waveguides (e.g., waveguides 204), each having a core and a cladding, adjacent one another (e.g., in a bundle).

At 804, at least a portion of the cladding of each of the optical waveguides is fused with the cladding of another one of the optical waveguides, such that the apparatus resulting therefrom is a monolithic structure. This fusing may be performed in the same region on each of the optical waveguides, such that the monolithic structure may be used as an optical feedthrough.

Many of the operations 700 of FIG. 7 described above may also be performed for the monolithic structure formed according to the operations 800 of FIG. 8. For example, the apparatus may be diced in the fused portion to form two apparatuses, which may be polished and later butted together (e.g., using one or more orientation features for alignment).

Embodiments of the invention heretofore can be used and have specific utility in applications within the oil and gas industry. Further, it is within the scope of the invention that other commercial embodiments/uses exist with one such universal sealing arrangement shown in the figures and adaptable for use in (by way of example and not limitation) industrial, chemical, energy, nuclear, structural, etc. While the foregoing is directed to preferred embodiments of the invention, other and further embodiments of the invention may be devised without departing from the basic scope thereof, and the scope thereof is determined by the claims that follow.

What is claimed is:

1. An optical waveguide feedthrough assembly comprising:
   a housing;
   an apparatus for transmitting light along multiple pathways, wherein:
      the apparatus is at least partially disposed in the housing, is a monolithic structure, and comprises a body having a plurality of bores with a plurality of large diameter optical waveguides disposed therein, each of the large diameter optical waveguides having a core and a cladding;

the body further comprises a first portion with a first outer diameter and a second portion with a second outer diameter, the second outer diameter being smaller than the first outer diameter;

at least a portion of the cladding of each of the optical waveguides is fused with the body to form the monolithic structure;

the plurality of large diameter optical waveguides extend beyond the length of the body;

an outer diameter of the cladding of each of the large diameter optical waveguides in at least a portion extending beyond the length of the body is at least 1 mm; and the cladding of each of the large diameter optical waveguides in the at least the portion extending beyond the length of the body is separate and distinct from one or more claddings of one or more other waveguides in the plurality of large diameter optical waveguides; and one or more annular sealing elements disposed between and contacting both an inner surface of the housing and an outer surface of the second portion of the body to provide a seal therebetween.

2. The assembly of claim 1, wherein the body comprises at least one orientation feature.

3. The assembly of claim 2, wherein the at least one orientation feature comprises at least one flat surface formed in an outer diameter of the body and parallel to an axis of the body.

4. The assembly of claim 1, wherein the annular sealing elements comprise at least one of v-ring seals, o-ring seals, or gasket members.

5. The assembly of claim 1, wherein the housing comprises metal and wherein the body and the core and cladding of each of the optical waveguides comprise silica glass.

6. The assembly of claim 1, wherein the body further comprises a sealing surface between the first outer diameter of the first portion and the second outer diameter of the second portion.

7. The assembly of claim 6, wherein the sealing surface comprises a convex frustoconical section between the first outer diameter of the first portion and the second outer diameter of the second portion.

8. The assembly of claim 1, wherein a temperature coefficient of the cladding of each of the optical waveguides is about the same as a temperature coefficient of the body.

9. The assembly of claim 1, wherein the body and the core and cladding of each of the optical waveguides comprise silica glass.

10. The assembly of claim 1, wherein the second portion is at least partially disposed in the housing and wherein the first portion is disposed outside the housing.

11. The assembly of claim 1, wherein the body further comprises a third portion having a third outer diameter and wherein the third outer diameter is smaller than the first outer diameter.

12. The assembly of claim 11, wherein the second portion is at least partially disposed in the housing and wherein the third portion and the first portion are disposed outside the housing.

13. The assembly of claim 1, wherein the body and the core and cladding of each of the optical waveguides comprise the same material.

* * * * *